US005887762A

United States Patent [19]

Hanna

[11] Patent Number: 5,887,762

[45] Date of Patent: Mar. 30, 1999

[54] REPLACEABLE VALVE SYSTEM

[75] Inventor: Emmanuel A. Hanna, Lakeview Ter., Calif.

[73] Assignee: Bobrick Washroom Equipment, Inc., North Hollywood, Calif.

[21] Appl. No.: 907,263

[22] Filed: Aug. 6, 1997

[51] Int. Cl.$^{6}$ .............................. B65D 88/54; G01F 11/36

[52] U.S. Cl. ...................................... 222/321.7; 222/321.1; 222/320; 222/251

[58] Field of Search .............................. 222/321.7, 321.1, 222/251, 325, 320

[56] References Cited

U.S. PATENT DOCUMENTS

| | | | |
|---|---|---|---|
| 2,233,716 | 3/1941 | Seidel | 222/321.7 |
| 2,515,328 | 6/1950 | Bobrick | 222/321.7 |
| 2,878,974 | 3/1959 | Dobkin | 222/321.7 |
| 2,885,125 | 5/1959 | Russell | 222/321.7 |
| 4,243,159 | 1/1981 | Spatz | 222/321.7 |
| 4,911,336 | 3/1990 | Blake | 222/321.7 |
| 4,949,877 | 8/1990 | Hanna et al. | 222/341 |
| 4,964,544 | 10/1990 | Hanna et al. . | |
| 5,476,108 | 12/1995 | Lawrence et al. . | |

*Primary Examiner*—Andres Kashnikow
*Assistant Examiner*—Keats Quinalty
*Attorney, Agent, or Firm*—Pretty, Schroeder & Poplawski

[57] ABSTRACT

A replaceable valve system for a fluid dispenser having a container with an opening for slidingly receiving the valve system, including an outer sleeve having an inlet end and an outlet end and being slidable in the container opening, the outer sleeve having a valve seat adjacent the inlet end thereof, a plunger slidable in the outer sleeve and having an internal passage for fluid flow from an inlet end to an outlet end, a one way valve positioned adjacent the inlet end for permitting fluid flow from the plunger inlet end to the outlet end while blocking fluid flow from the outlet end to the inlet end, an inner sleeve carried within the outer sleeve, a first spring carried between the plunger and inner sleeve urging the plunger and inner sleeve away from each other, a second valve positioned within the inner sleeve, a second spring positioned between the second valve and inner sleeve urging the second valve into sealing engagement with the outer sleeve valve seat for blocking fluid flow from the outer sleeve into the container.

9 Claims, 3 Drawing Sheets

REPLACEABLE VALVE SYSTEM

BACKGROUND OF THE INVENTION

This invention relates to fluid dispensers such as are used in washrooms and similar locations for dispensing soaps and lotions. A wide variety of such dispensers have been developed and are in use in various installations. Maintenance of a dispenser often is a problem, due to wear and tear on the unit, damage resulting from improper usage, and vandalism. Often it is necessary to replace the entire dispenser when such an event occurs.

Replacement and/or repair of a damaged unit can be both time consuming and expensive, in costs of parts and costs of labor, as well as being an inconvenience to users until the replacement is completed.

Accordingly, it is an object to the present invention to provide a new and improved dispenser design utilizing a replaceable valve system which permits replacement of the valve construction in the dispenser, with utilization of a simple tool such as a screw driver, and without requiring removal and replacement of the entire dispenser.

Dispensers with provisions for various forms of repair are presently known. See for example U.S. Pat. Nos. 4,949,877; 4,964,544; and 5,476,197.

SUMMARY OF THE INVENTION

The presently preferred form of the replaceable valve system for a fluid dispenser having a container with an opening for slidingly receiving the valve system, includes an outer sleeve having an inlet end and an outlet end and being slidable in the container opening, with the outer sleeve having a valve seat adjacent the inlet end thereof, a plunger slidable in the outer sleeve and having an internal passage for fluid flow from an inlet end to an outlet end of the plunger, a one way valve positioned adjacent the inlet end of the plunger for permitting fluid flow from the plunger inlet end to the plunger outlet end while blocking fluid flow from the outlet end to the inlet end, an inner sleeve carried within the outer sleeve, first spring means carried between the plunger and inner sleeve urging the plunger and inner sleeve away from each other, a second valve positioned within the inner sleeve, second spring means positioned between the second valve and inner sleeve urging the second valve into sealing engagement with the outer sleeve valve seat for blocking fluid flow in reverse from the outer sleeve into the container.

The preferred form further includes means for maintaining the valve system in position in the container, while permitting removal and replacement of valve systems as desired.

In operation manual pressure on the plunger compresses the first spring means and forces fluid from within the outer sleeve outward through the one way valve and the plunger internal passage. Releasing the manual pressure on the plunger permits the first spring means to expand enlarging the volume within the outer sleeve and drawing fluid from the container around the poppet valve into the outer sleeve.

DESCRIPTION OF THE PREFERRED EMBODIMENT

Figure 1:
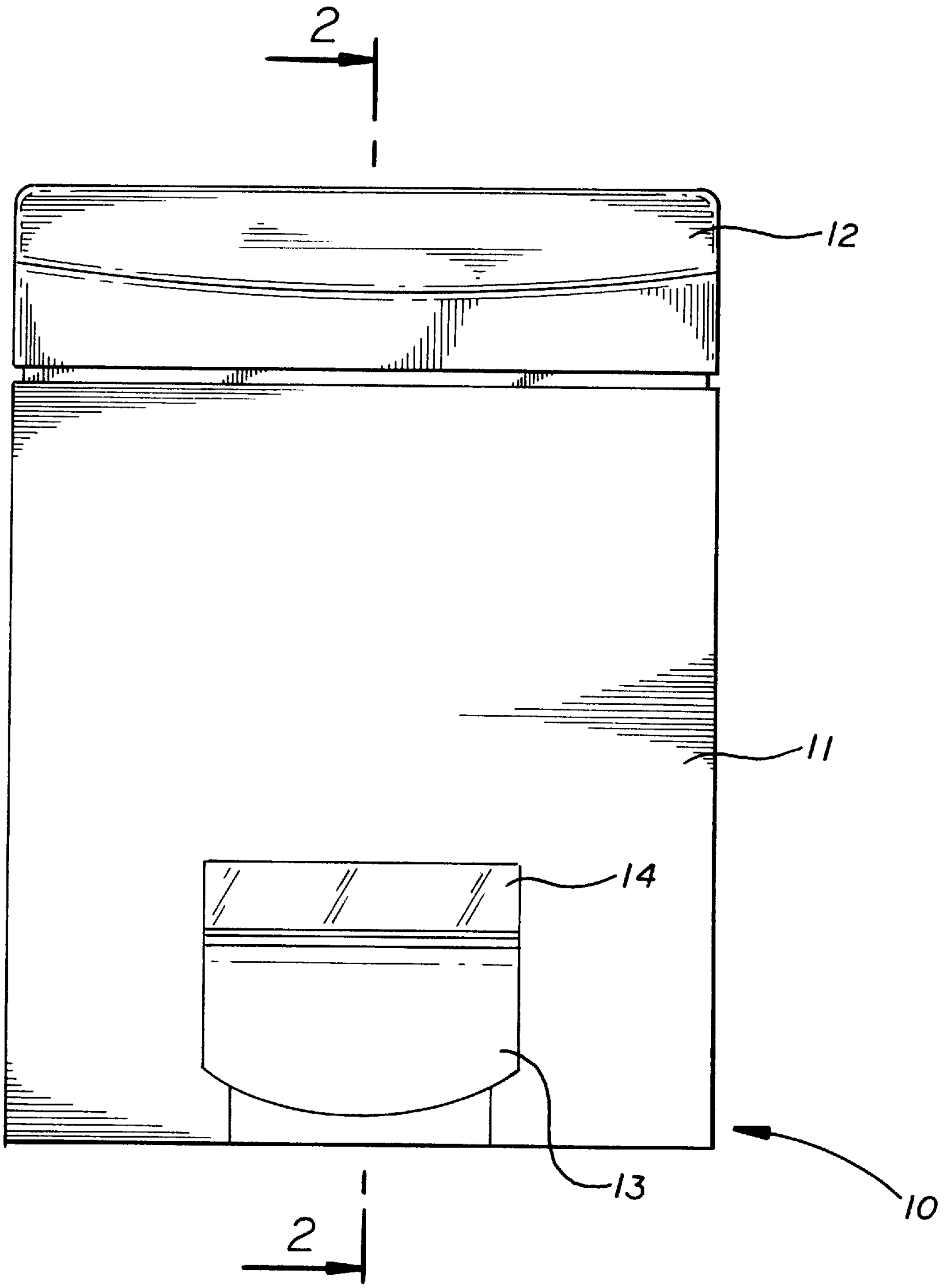
FIG. 1 is a front view of a dispenser incorporating the presently preferred embodiment of the valve system of the invention.

A front view of a dispenser 10 is shown in FIG. 1, with the dispenser having a container 11, a cover 12, a plunger 13, and a viewing window 14. Fluid is dispensed from the container in the conventional manner, by pushing inward on the plunger 13. The viewing window 14 provides an indication of when the dispenser needs to be refilled.

Figure 2:
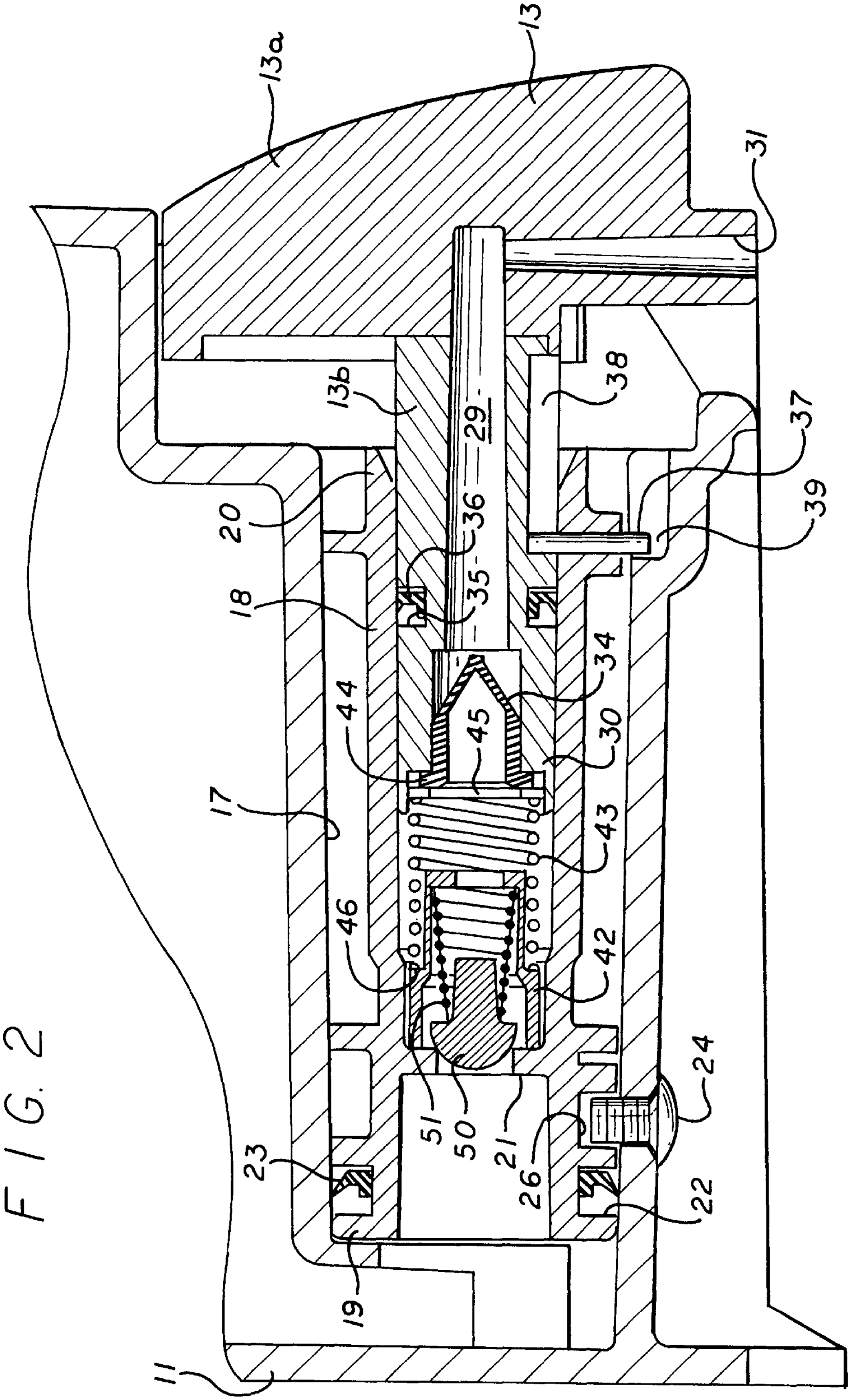
FIG. 2 is an enlarged partial sectional view taken along the line 2—2 of FIG. 1.

Turning to FIG. 2, the dispenser container 11 has an opening 17 for slidingly receiving the valve system. The valve system includes an outer sleeve 18 having an inlet end 19 and an outlet end 20. A valve seat 21 is provided adjacent the inlet end of the outer sleeve. Typically an annular groove 22 is provided in the outer sleeve adjacent the inlet end, with a flexible seal 23 positioned in the groove.

Figure 3:
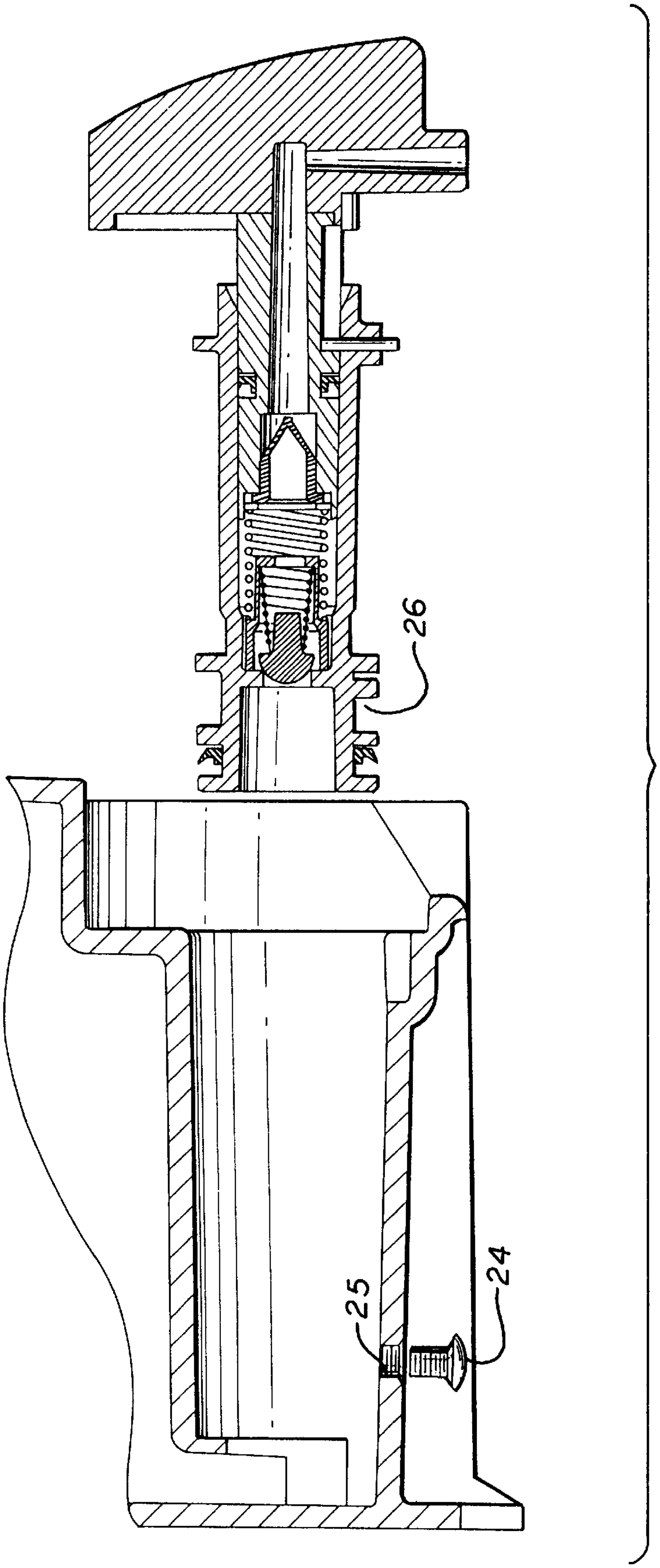
FIG. 3 is a view similar to that of FIG. 2 showing the valve system removed from the container of the dispenser.

The various components of the valve system are carried in the outer sleeve, which is slidable in the opening 17 of the container, being movable between the installed positioned of FIG. 2 to the removed position of FIG. 3. A screw 24 may be positioned in an opening 25 in the container to engage another opening 26 in the outer sleeve for maintaining the valve system in position in the container.

The plunger 13 is slidably positioned within the outer sleeve 18, and has an internal passage 29 for fluid flow from the inlet end 30 to the outlet end 31 of the plunger. In the embodiment illustrated, the plunger is made of two pieces 13*a* and 13*b* which are joined together. Alternatively, the plunger 13 could be made as a single piece.

A one way valve 34 is positioned adjacent the inlet end 30 of the plunger, and in the embodiment illustrated, a flapper valve is utilized. The one way valve provides for fluid flow from the inlet end of the plunger to the outlet end of the plunger, while blocking reverse flow from the outlet end to the inlet end.

Preferably, an annular groove 35 is provided in the outer surface of the plunger 13, with a flexible seal 36 positioned in this groove.

Desirably a guide pin 37 is carried in the outer sleeve 18, with one end of the guide pin projecting into a groove 38 of the plunger. The other end of the guide pin may project into a clearance opening 39 of the container. The engagement of the pin and the plunger prevents rotation of the plunger and sleeve relative to each other. The outer face of the plunger 13 has a flat top edge, preventing rotation of the plunger relative to the container.

An inner sleeve 42 is carried within the outer sleeve 18, with a first spring 43 positioned within the outer sleeve and about the inner sleeve 42. The first spring 43 is positioned between the plunger and the inner sleeve for urging the plunger and the inner sleeve away from each other.

Typically the one way valve 34 has an outwardly turned rim 44, with a washer 45 between the rim 44 and one end of the spring 43. The other end of the spring 43 bears against a shoulder 46 of the inner sleeve 42. A second valve 50, preferably a poppet valve, floats within the inner sleeve 42, with a second spring 51 positioned within the inner sleeve between the poppet valve and the inner sleeve for urging the poppet valve toward the valve seat 21 of the outer sleeve. This construction provides for blocking fluid flow in reverse from the outer sleeve into the container, while permitting fluid flow from the container into the outer sleeve.

Typically, a poppet valve is an elongate structure having a cylindrical stem with a spherical surface at one end. The cylindrical stem at the other end is designed to fit within a coil spring that pushes the valve to position the spherical end in a circular orifice for blocking fluid flow through the orifice.

The valve system is shown in the rest position in FIG. 2. To dispense some fluid, a manual pressure is provided on the plunger 13, pushing the plunger to the left as shown in FIG. 2. This action compresses the spring 43 and forces liquid from the interior of the outer sleeve outward, to the right, through the flapper valve and the outlet passage 29 of the plunger. The increase in fluid pressure within the outer sleeve also provides an increase in pressure on the poppet valve, maintaining the poppet valve in engagement with the valve seat.

When the manual pressure on the plunger is released, the spring 43 moves the plunger to the right to the position of FIG. 2, thereby producing a vacuum within the outer sleeve. This vacuum is sufficient to overcome the force of the second spring 51, permitting fluid flow from the container around the poppet valve 50 and into the interior of the outer sleeve. The dispenser is now ready for another fluid discharge stroke.

With the construction as described and illustrated, a reliable valve system is obtained. Also, the entire valve system can be removed from the container by removing the single screw 24. A new valve system may be installed, or the initial valve system may be repaired or refurbished and then re-installed.

Another advantage of the structure of the invention is that the poppet valve assembly 42, 50, 51 fits easily in the same location as other one-way valves. See for example, the flapper valve in co-pending application Ser. No. 08/701,788, filed 26 Aug. 1996, or the capsule valve in U.S. Pat. No. 4,949,877. This permits replacing such earlier valves with a more versatile valve design. Also the valve can be made of a chemical resistant material which can replace existing nonchemical resistant valves, thus converting a dispenser to be able to dispense antimicrobial soap or medical cleansers without changing the whole dispensing unit.

I claim:

1. A replaceable valve system for a fluid dispenser having a container with an opening for slidingly receiving the valve system, the valve system including in combination:

an outer sleeve having an inlet end and an outlet end and being slidable in said container opening, said outer sleeve having a valve seat adjacent said inlet end thereof;

a plunger slidable in said outer sleeve, said plunger having an internal passage for fluid flow from an inlet end to an outlet end of said plunger;

a one way valve positioned adjacent said inlet end of said plunger for permitting fluid flow from said plunger inlet end to said plunger outlet end while blocking fluid flow from said outlet end to said inlet end;

an inner sleeve carried within said outer sleeve;

first spring means carried between said plunger and said inner sleeve urging said plunger and said inner sleeve away from each other;

a poppet valve positioned within said inner sleeve;

second spring means positioned between said poppet valve and said inner sleeve urging said poppet valve into sealing engagement with said outer sleeve valve seat for blocking fluid flow in reverse from said outer sleeve into said container, and with manual pressure on said plunger compressing said first spring means and forcing fluid from within said outer sleeve outward through said one way valve and said plunger internal passage, and with release of the manual pressure on said plunger permitting said first spring means to expand drawing fluid from said container around said poppet valve into said outer sleeve.

2. A replaceable valve system as defined in claim 1 including means for maintaining said valve system in position in said container, including:

a guide groove in said plunger, and a guide pin in said outer sleeve, with one end of said guide pin riding in said guide groove, and further including a guide opening in the outer surface of said outer sleeve for receiving a positioning screw removably carried in said container.

3. A replaceable valve system as defined in claim 2 including a first sliding seal adjacent said outlet end of said outer sleeve between said container and said outer sleeve, and a second sliding seal between said outer sleeve and said plunger downstream of said one way valve.

4. A replaceable valve system as defined in claim 3 wherein said one way valve is a flapper valve with an outwardly turned rim at the upstream end thereof, and including a washer positioned between said first spring means and said rim, with said first spring means maintaining said flapper valve in position in said plunger.

5. A replaceable valve system for a fluid dispenser having a container with an opening for slidingly receiving the valve system, the valve system including in combination:

an outer sleeve slidable in said container opening, and having a valve seat adjacent the sleeve inlet end;

a plunger slidable in said outer sleeve, and having an internal passage for fluid flow through said plunger;

a first valve positioned at said plunger for permitting fluid flow outward through said plunger while blocking reverse fluid flow;

an inner sleeve carried within said outer sleeve;

first spring means carried between said plunger and said inner sleeve urging said plunger and said inner sleeve away from each other;

a second valve positioned in said inner sleeve; and second spring means positioned between said second valve and said inner sleeve urging said second valve into sealing engagement with said outer sleeve valve seat for blocking fluid flow from said outer sleeve into said container, with manual pressure on said plunger compressing said first spring means and forcing fluid from within said outer sleeve outward through said plunger, and with release of the manual pressure on said plunger permitting said first spring means to expand drawing fluid from said container around said second valve into said outer sleeve.

6. The replaceable valve system of claim 5, wherein the second valve is moveable between a first position engaging the valve seat when the plunger is compressed and a second position spaced from the valve seat when manual pressure on the plunger is released.

7. The replaceable valve system of claim 5, wherein the first spring means and the second spring means are downstream of the valve seat.

8. The replaceable valve system of claim 5, wherein the second valve has a spherical surface at one end that engages the valve seat.

9. The replaceable valve system of claim 8, wherein the second valve has a cylindrical stem extending downstream of the valve seat.

* * * * *